United States Patent [19]

Coke et al.

[11] Patent Number: 4,614,686

[45] Date of Patent: Sep. 30, 1986

[54] SYNTHETIC RUNNING SURFACE

[75] Inventors: Harry E. Coke; Gary W. Gill, both of Carrollton, Tex.

[73] Assignee: Southwest Techni-Systems, Inc., Dallas, Tex.

[21] Appl. No.: 516,096

[22] Filed: Jul. 22, 1983

Related U.S. Application Data

[62] Division of Ser. No. 295,023, Aug. 21, 1981, Pat. No. 4,420,513.

[51] Int. Cl.[4] .................... B32B 5/16

[52] U.S. Cl. .................... 428/327; 427/138; 427/139; 427/385.5; 427/393.5; 427/407.1; 428/332; 428/423.3

[58] Field of Search .................... 427/393.5, 139, 138, 427/385.5, 407.17, 407.1; 404/32, 27; 428/323, 423.3, 327, 332

[56] References Cited

U.S. PATENT DOCUMENTS

| | | | |
|---|---|---|---|
| 3,801,421 | 4/1974 | Allen et al. | 428/17 |
| 4,196,259 | 4/1980 | Augustin et al. | 427/385.5 |
| 4,211,804 | 7/1980 | Brizzolara | 427/385.5 |

*Primary Examiner*—Edith Buffalow

*Attorney, Agent, or Firm*—Hubbard, Thurman, Turner & Tucker

[57] ABSTRACT

A textured synthetic running surface and the like comprising a urethane elastomer base having thoroughly dispersed granular particles of urethane or rubber elastomers. Shredded particles of solid urethane or rubber of a nominal maximum dimension of from 0.062 to 0.125 inches are dispersed through the elastomer base and totally encapsulated thereby in concentrations of 26% to 32% by weight to provide a non-slip resilient running surface. The surface is applied by mixing two parts of liquid urethane elastomer in a mixing drum followed by mixing in of the granular particles in measured batches. The batched mixture is discharged from the mixing drum to a hopper which feeds the mixture by way of a pump to an application gun.

20 Claims, 7 Drawing Figures

SYNTHETIC RUNNING SURFACE

This application is a division of application Ser. No. 295,023, filed Aug. 21, 1981, now U.S. Pat. No. 4,420,513.

BACKGROUND OF THE INVENTION

1. Field of the Invention

The present invention pertains to a running surface comprising a urethane elastomer layer having encapsulated particles of resilient material including solid urethane or rubber granules and an improved process for forming the surface.

2. Background Art

In the construction of synthetic sufaces for athletic fields such as running tracks for track and field events, jogging tracks, fence warning tracks and other artifical athletic playing surfaces, it is known to provide surfaces of solid urethane elastomer which may be applied over substrates including asphalt, concrete and other substructures. Such surfaces have proven to be superior in that they are not subject to environmental effects, and may be considered safer than natural playing surfaces or other types of man made surfaces for certain types of athletic events.

Indoor and outdoor running surfaces formed of a layer of poured urethane elastomer which cures to a solid resilient suface, have become quite popular for athletic runways or tracks. Urethane elastomers are relatively easy to handle in liquid form at average ambient temperatures are curable to a solid at ambient temperatures, and have relatively long life and weatherability. However, untextured or solid urethane elastomer surfaces lack the surface roughness desired for running surfaces, particularly of the type used for track and field events. Accordingly, heretofore it has been the practice in the art of constructing urethane runways and the like to provide a roughened surface by broadcasting particles and granules of solid urethane onto the surface after the liquid urethane has been poured or sprayed in place to form the runway base. The broadcasting of granules or surface coatings has been unsatisfactory in that adhesion of the granules to the urethane base is incomplete and the granules eventually break free or are partially broken away from the base. Accordingly, the track or runway surface again loses its attractive characteristics and resurfacing operations must be undertaken at frequencies which are costly.

Another problem with prior art applications of surface granules to increase traction on running tracks is that most techniques fail to provide a uniform distribution of granules. Accordingly, rough spots may develop in some areas of the running track whereas other areas may not have enough surface roughness.

Still another problem associated with prior art practice in constructing urethane elastomer running surfaces, pertains to the problem of maintaining a fairly uniform layer of the liquid urethane after it is poured on the substrate. Outdoor running tracks in particular, must be sloped to provide for suitable water runoff and indoor tracks are normally banked or sloped in the turns since they are shorter in overall length. Accordingly, the consistency of the liquid elastomer during application must be such that it then becomes difficult to pour and distribute. Alternatively, if the liquid elastomer is of the proper viscosity for suitable pouring and distribution, it will tend to run off the substructure leaving a thin coating along one longitudinal edge and a thicker coating along the opposite longitudinal edge of the track. Accordingly, the outside lanes of the track do not have the proper thickness.

The foregoing problems associated with the provision of artificial running surfaces and the like, and in particular, urethane elastomer running tracks, have been overcome by an improved surface composition in accordance with the present invention. The improved synthetic runway composition of the present invention is made particularly attractive due to an improved method of application of a urethane elastomer which includes the use of improved apparatus for mixing and applying the material comprising the surface. The composition of material, method and apparatus of the present invention is indicated to be capable of outstanding commercial success and has overcome a substantial number of problems heretofore known in the art of providing synthetic running surfaces.

SUMMARY OF THE INVENTION

The present invention provides an improved composition for synthetic running surfaces or runways and other surfaces used in indoor and outdoor athletic events. In accordance with one aspect of the present invention, there is provided an improved running surface characterized by a layer of urethane elastomer having totally encapsulated granules of elastomeric material which provides suitable surface texture for runner traction, and which is not subject to the short life of textured surfaces which are provided by broadcasting friction providing material on top of the elastomeric base material.

In accordance with another aspect of the present invention, there is provided an improved running surface or base for running tracks and the like wherein a liquid urethane elastomer is formulated and mixed with granular particles of solid urethane elastomer or other elastomers including synthetic or natural rubber to provide a resilient running surface which reduces runner fatigue and injury due to impact forces on the runner's body and limb joints. For example, it has been determined that by providing a running track having a urethane elastomer base with a matrix of encapsulated granule particles of solid urethane, rubber or combined layers of urethane and rubber in the general range of approximately 30% by weight of the total mixture that a surface of improved appearance and runner comfort is obtained. The range of particle or granule size which meets the desired properties of the surface may have nomnal dimensions of approximately 0.062 to slightly more than 0.125 inches.

In accordance with yet another aspect of the present invention there is provided an improved process for providing a synthetic running surface utilizing liquid elastomer which cures at average ambient temperatures and wherein granular material may be mixed with the liquid elastomer before applicatin of the material to a substrate whereby the granular material is totally encapsulated and evenly distributed throughout the base material.

In accordance with yet another aspect of the present invention, there is provided an improved elastomeric running track surface or the like wherein the track is applied in at least three layers to provide the overall base thickness and wherein the percentage of granular material by weight may be varied from the first or bottom layer to the top or surface layer to provide an even and uniform appearance of the granular material in the top layer.

In accordance with a still further aspect of the present invention, there is provided a process for mixing and applying a synthetic elastomer surface having granular material distributed throughout wherein the separate components of the elastomer are mixed in such a way as to prevent clogging and accumulation of material in the batching apparatus, provide even distribution and dispersal of the granular material throughout the batch or mix and provide manageable batch sizes which may be applied with conventional applicator equipment and does not require specialized equipment to pump the composite mixture.

The present invention also provides for a process utilizing an apparatus for mixing and batching a liquid elastomer having granular material dispersed throughout, which apparatus is easily loaded and provides for continuous self-cleaning, as well as easy batching operations.

The foregoing features and advantages of the present invention, as well as other superior aspects thereof will be further appreciated upon reading the detailed description which follows.

DESCRIPTION OF THE PREFERRED EMBODIMENTS

Figure 1:
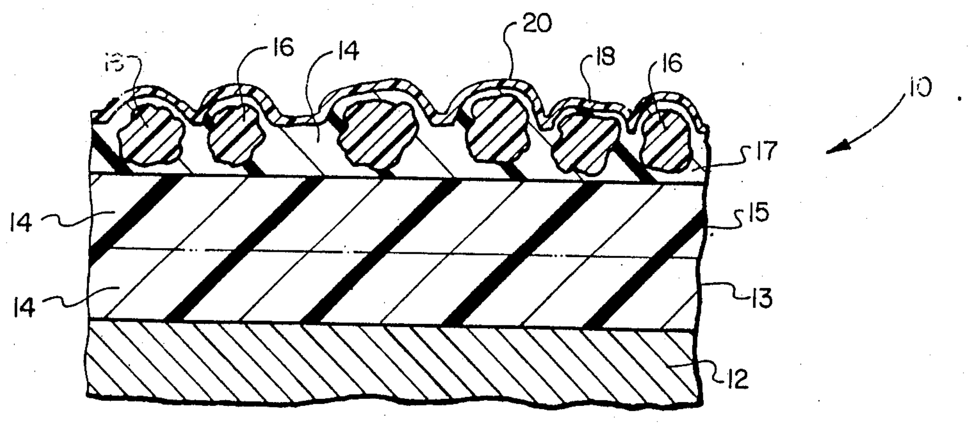
FIG. 1 is a cross-section detail elevation view of a portion of the improved synthetic running surface of the present invention.

In the drawings, like reference characters refer to like parts throughout the specification and drawings. The drawings are not necessarily to scale and certain portions have been exaggerated in scale to better illustrate the structural features of the present invention.

Referring to FIG. 1 of the drawings, there is illustrated a small detail cross-sectional view of the improved synthetic running surface or runway of the present invention which is generally designated by the numeral 10. The running surface 10 is illustrated as being applied over a substrate 12 which may comprise various materials and typically for outdoor running tracks comprises a typical road asphalt composition. However, it will be appreciated that the improved runway composition of the present invention may be applied over other substrates including concrete, wood, steel and other materials. The composition 10 is primarily characterized by a base material comprising a urethane elastomer 14 which may be one of several types commercially available and in particular, may comprise a urethane elastomer manufactured under the trademark TARTAN by 3M Company of St. Paul, Minn. The base elastomer 14 is formulated in two parts which are mixed prior to application to the final end use, which mixture results in a hardening or solidification of the composition to form a resilient visco-elastic substance. As described previously herein, it has heretofore been the practice to provide running track surfaces of a solid urethane or other elastomeric base which is then texturized to provide a tractive surface by broadcasting granular particles of solid material on top of the base before completion of the cure or by texturing the base before completion of the cure with mechanical techniques. However, these surfaces have proved to be inferior to the present invention which is composed of the elastomeric base 14 comprising layers 13 and 15 of unfilled urethane elastomer and a third or top layer 17 throughout which is dispersed granular particles 16 having a nominal maximum dimension but otherwise being of irregular shape. The granular particles 16 are preferably of an elastomeric material such as the urethane elastomer used for the base 14. However, other materials have proven to be suitable for the granular particles 16, as will be described further herein.

In accordance with an improved application process of the present invention, the granular particles 16 are distributed substantially evenly throughout the layer 17 of the base 14 and are totally encapsulated within the base material. This composition provides a superior texture or roughness to the surface 18. In accordance with the present invention, it has been determined that the nominal maximum dimension of the granules 16 should be in the range of approximately 0.062 to 0.125 inches. Moreover, the density or total percentage by weight of the granular particles, as a percentage of the total mixture of the layer 17, should be in the range of 26% to 30%. The particles may also be formed from an alternate material of the type described hereinbelow in regard to the embodiment of FIG. 2 of the drawings.

As shown in drawing FIG. 1, the track surface composition 10 further includes a relatively thin sealing layer and color coat 20 which is applied after application of the total thickness of the base material and after the base material together with the encapsulated granular particles has cured or solidified. A suitable sealing or color coat may be applied using a no. 57 red two component urethane composition manufactured by Synthetic Surfaces Co., Scotch Plains, N.J. Although various thicknesses of the runway 10 may be applied, it has been determined that a preferred total thickness should be in the range of approximately 0.38 to 0.50 to inches.

Figure 2:
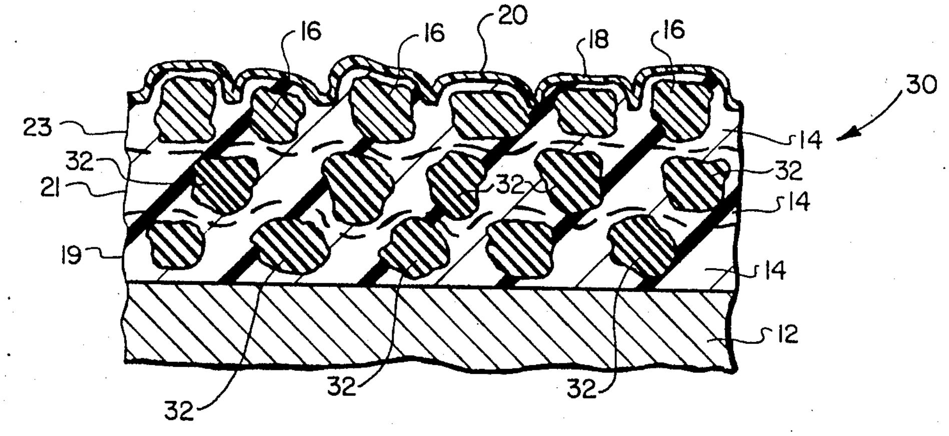
FIG. 2 is a view similar to FIG. 1 illustrating another embodiment of the running surface of the present invention.

An alternate embodiment of the running surface or runway of the present invention is illustrated in FIG. 2 and generally designated by the numeral 30. The runway 30 is formed of the same base material 14 as the runway 10. However, the runway 30 includes two layers 19 and 21 having encapsulated particles of solid elastomeric granules 32 of irregular shape. The runway 30 has a top layer 23 similar to the layer 17 of the runway 10 and including encapsulated particles 16 of urethane elastomer. The particles 32 have a maximum linear dimension also in the range of approximately 0.062 to 0.125 inches. A preferred particle size for the particles 32, as well as the particles 16 is, however, approximately 0.125 inches. This size particle provides better traction, a proper cushion effect and provides improved holding of the liquid base material while it is being poured to form the runway. This latter property is particularly important for the formation of running tracks which have a cross-sectional slope. A preferred material or materials for the particles 32 has been discovered to be shredded rubber of the type used for automobile passenger tires of either the SBR (styrene butadiene) type or natural rubber. However, it is contemplated that other elastomeric materials exhibiting the same physical properties as the aforementioned types of rubbers, may also be used for the particles 32. The thickness of the runway 30 is also preferably on the order of 0.38 to 0.50 inches for a typical running track surface. The runway 30 is more economical to produce than the runway 10 and has also unexpectedly provided superior properties of good runner feel or cushion effect that is desired for competition track and field athletics.

Figure 3:
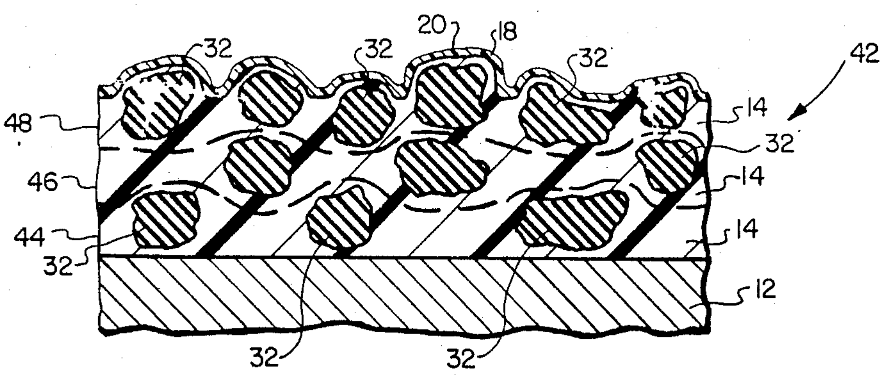
FIG. 3 is a view similar to FIGS. 1 and 2 of a third embodiment of the present invention.

Referring to FIG. 3, there is illustrated a detailed cross-section of a runway 42 such as the runway 10 or 30 but which is modified with respect to the concentration of the granular particles which are applied in accordance with a preferred process of the present invention. The runway 42, illustrated in FIG. 3, also comprises three layers 44, 46 and 48 of urethane elastomer base material 14 into which granular rubber particles 32 have been mixed. As with the application of the layers of the runways 10 and 30 the layers 44, 46 and 48 are each applied at time spaced intervals with the application of the layer 44 to the substrate 12 being, of course, the first layer applied. Time is alloted between the application of each of the layers to allow the previously applied layer to cure to a solid consistency capable of bearing the weight of the application equipment. Normally, a cure or solidification time of 24 hours is sufficient. It has been determined in accordance with the present invention, that in the application of the discrete layers 44 and 46 that the concentration or composition of the layers preferably includes rubber granules 32 in the amount of approximately 29.5% of the total weight of the composition including the base material 14. However, for the sake of a more uniform appearance, it has been determined that it is desirable to increase the composition or concentration of granular particles 32 in the layer 48 to approximately 32% of the total weight of the composition.

Figure 5:
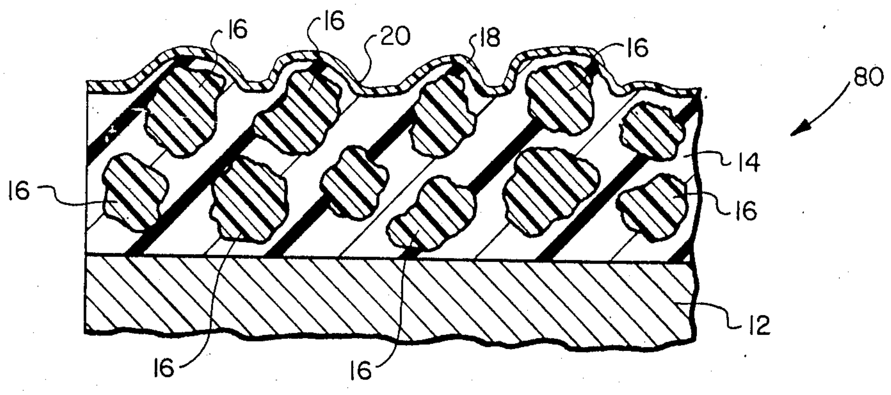
FIGS. 5, 6 and 7 are views similar to FIGS. 1, 2 and 3 showing further embodiments of the present invention.
Figure 6:
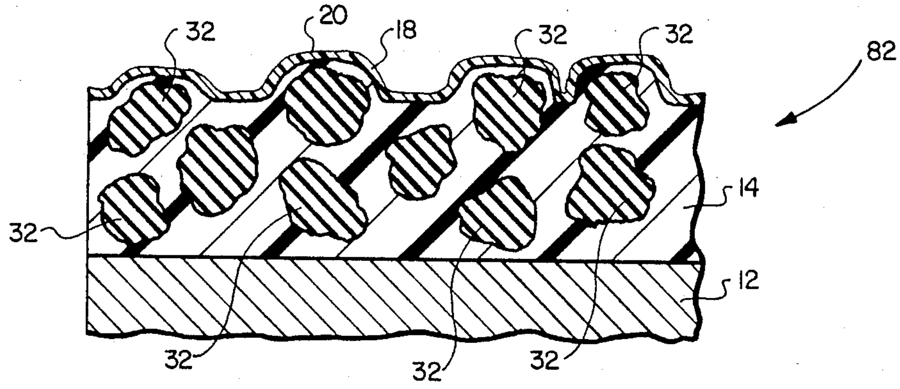

FIGS. 5 and 6 illustrate still further alternate embodiments of the present invention. Referring to FIG. 5, there is illustrated a synthetic runway 80 having the urethane elastomer base 14 poured on a substrate 12 and having fully encapsulated therein urethane particles 16. It is contemplated that runway 80 may be poured in one or more layers whereby the total thickness is such that each layer has a thickness greater than one particle thickness, as illustrated. However, it is preferred to work with layers which are relatively thin and of a nominal thickness no more than the thickness of the particles, as has been described for the embodiments of FIGS. 1, 2 and 3. The runway 80 is also provided with a sealing and color coating 18 to form the running surface 20.

The embodiment of FIG. 6 is similar to FIG. 5 and comprises a runway 82 having totally encapsulated rubber particles 32. The runway 82 may also be poured in one application of a thickness greater than the nominal thickness of the particles 32. However, application processes as described herein wherein the runway is poured in three separate layers has been determined to be a preferred mode of practicing the present invention.

Figure 7:
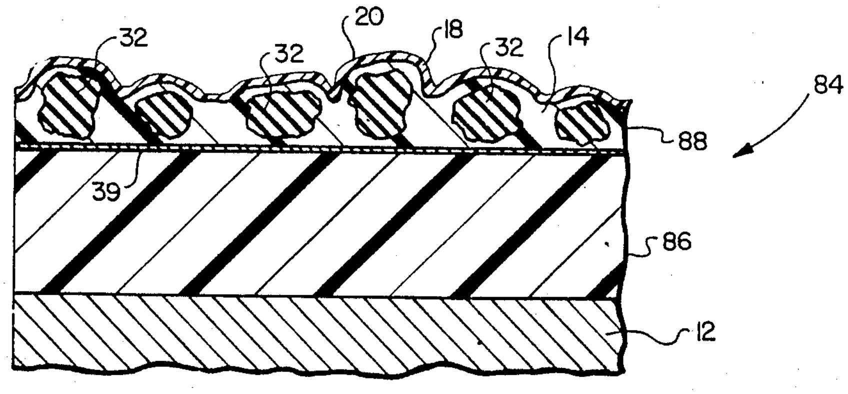

In a number of applications of the present invention, it is desired to place a layer of urethane elastomer 14 including encapsulated particles 16 or 32 over a preexisting base or substrate comprising, for example, a solid urethane elastomer runway or the like. Referring to FIG. 7 of the drawings, there is illustrated a detail cross-sectional view of a typical running surface or runway 84 which has been formed utilizing a preexisting urethane elastomer base 86. The base 86 may typically be of the type which comprises an unfilled urethane elastomer onto which granular particles may have been broadcast or spread after pouring the base. After some use, particles applied in the aforementioned way are torn or worn away so that a substantially smooth running surface lacking the traction and cushioning properties desired is all that remains. However, such surfaces as that illustrated in FIG. 7, can be improved by the application of a layer 88 comprising a mixture of a base material of urethane elastomer, such as the material 14 into which particles 32 have been mixed before application over the preexisting base 86. Typically, preexisting solid urethane tracks are of a nominal thickness of 0.25 to 0.38 inches. Accordingly, the textured surface which must be added to form the running surfaces 38 is normally of an average dimension of 0.125 inches.

In order to provide proper adhesion of the layer 88 over preexisting urethane elastomer surfaces, it is desirable to use an adhesive or primer 39 applied to the top of the preexisting base before application of the textured layer. One suitable type of primer which may be used for adding the composition of the present invention to preexisting urethane elastomer surfaces, is a phenolic primer manufactured by Development Associates Company, as their Part No. 1491.

Those skilled in the art will appreciate that other variations of the thickness of the base material, the size of the particles 16 and 32, and the concentration of particles in the base material may vary somewhat in accordance with the teaching of the present invention without departing from the scope or spirit thereof. However, the actual values given for the properties of the improved running surface of the present invention have proved to be optimum for surfaces that are used for competition track and field events, for example.

It is contemplated that in accordance with the present invention, that the composition of the base material 14 is preferably of a urethane elastomer which is provided in a two part liquid form which when mixed together in the preferred proportions, undergoes a chemical reaction which provides a solid resilient composition. Although various urethane elastomers and the like could be used for the base material 14, a one suitable type of material is that mentioned previously which is manufactured under the trademark TARTAN by 3M Corporation, St. Paul, Minn. The aforementioned brand of urethane elastomer is provided in separate quantities of a viscous liquid known as part A, a polyol containing a catalyst and antioxidants, for example, and part B, an isocyanate. In accordance with the present invention, there is provided an improved process for mixing the A and B parts of the elastomer base material 14 together with the mixing in or dispersal of the granular particles 16 or 32 prior to application of the mixture of the substrate to provide the runway surface described hereinabove. The improved process for forming a running surface or the like, in accordance with the present invention, utilizes an improved apparatus for mixing and pumping the liquid composition at the site of application.

Figure 4:
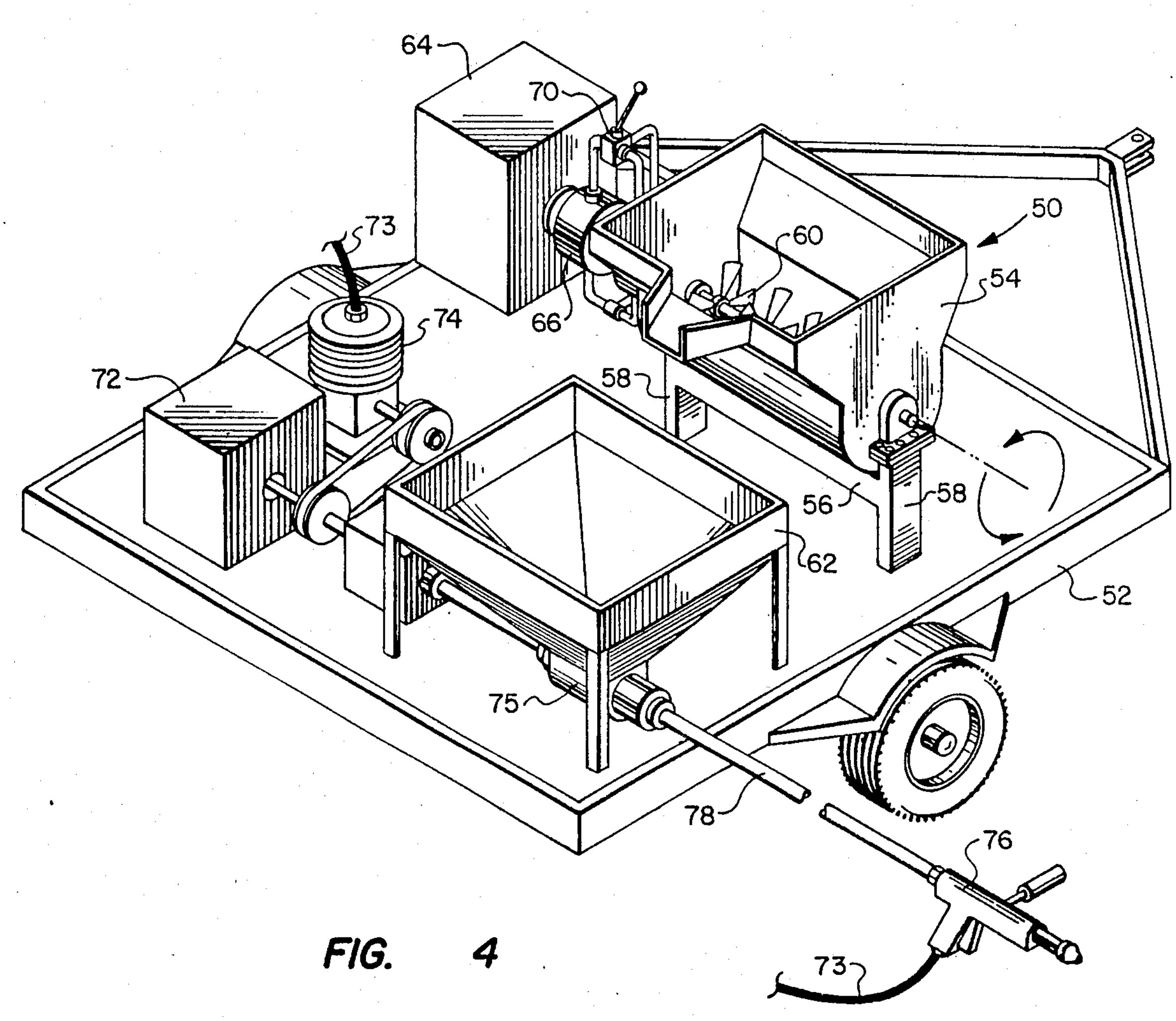
FIG. 4 is a perspective view of apparatus used in practicing the present invention.

Referring to FIG. 4 of the drawings, there is illustrated an apparatus 50 which may be adapted to mount on a portable trailer or the like generaly designated by the numeral 52. The apparatus 50 includes a mixing drum 54 which is mounted on the trailer 52 on a frame 56 having spaced apart upright members 58 which are adapted to pivotally support the drum 54 for rotation about an axis of the drum mixing shaft, generally designated by the numeral 60, whereby the contents of the drum 54 may be poured out of the drum into a hopper mounted on the trailer frame and generally designated by the numeral 62. The drum 54 includes a suitable mixing element mounted on the shaft 60 for rotation to thoroughly mix the contents of the drum prior to discharge of the mixture into the hopper 62. The shaft 60 is preferably rotatably driven by a power unit comprising an internal combustion engine 64 driving a hydraulic pump 66 which is coupled in circuit with a motor, not shown, drivably connected to the shaft 60. A suitable control valve 70 is provided for reversing the direction of the mixing shaft to facilitate unloading of a batch from the mixer drum.

The apparatus 50 includes a second internal combustion engine 72 which is drivably connected to an onboard air compressor 74 providing compressed air by way of hose 73 to a spray or application gun 76 which is of the internal mixing type providing for use of compressed air as a propellant to apply the liquid mixture of the runway composition to the substrate. The gun 76 is preferably provided on an elongated pole type handle, not shown, and is of a type commercially available from Spray Force Systems, Fresno, Calif. The engine 72 is also drivably connected to an auger type pump 75 mounted at the base of the hopper 62 and adapted to pump the mixture from the hopper by way of a flexible hose 78 to the gun 76.

By mounting the mixing of drum 54 above the hopper 62, a quantity of the composite mixtures for the various embodiments of the runway may be mixed in the mixing drum and then discharged into the hopper for substantially continuous feed by the aforementioned pump through the conduit 78. Moreover, the mixing drum is then available for receiving a new quantity of the respective parts of the urethane elastomer, as well as a quantity of granular particles for premixing prior to discharge of the mixed batch. By arranging the drum 54 and the hopper 62, as illustrated on the apparatus 50, improved control over the batching and mixing process is obtained without the risk of damage to the equipment should a particular batch commence curing at an accelerated rate prior to being applied to the track surface. For the application of the layers 13 and 15 of the runway 10, conventional feeding and mixing equipment may be used if desired.

In accordance with a preferred method of providing a runway in accordance with the present invention, the apparatus 50 is utilized to mix parts A and B of the liquid urethane elastomer in the drum 54 followed by the addition of a measured quantity of granular particles to the drum 54 to be further mixed with the liquid mixture, followed further by discharge of the thoroughly mixed material into the hopper 62 for substantially continual pumping therefrom to the application gun 76. In accordance with the present invention, the following procedure is carried out in mixing and applying the composition of the present invention to a substrate to form a textured runway. Part A of the urethane elastomer is modified to provide a gel curve or viscosity increase point of approximately 21 minutes from the normal range of 14 to 17 minutes. Part A of the elastomer is added to the mixing drum 54 first. Part A tends to dissolve previously mixed parts A and B and therefore will keep any previously mixed batches from curing within the drum. After the addition of part A to the drum, part B is added after part A has had a chance to initiate some self-cleaning of the drum by bringing into solution residue from previously mixed batches. Parts A and B are mixed in the ratio of approximately 9 to 1. Accordingly, ten gallon batches are mixed by adding 9 gallons of part A to the drum 54 followed shortly thereafter by the addition of one gallon of part B. Parts A and B are mixed for approximately 30 seconds to provide thorough dispersal of part B throughout part A. After thorough mixing of parts A and B, the granular particles 16 or 32 are added in the proportions indicated hereinabove and continued mixing is carried out for approximately 15 seconds to provide thorough and uniform dispersal of the particles throughout the mixture. The completely mixed batch is then discharged from the drum 54 into the hopper 62 and pumped from the hopper to the application gun 76. Ambient temperatures at which the mixture may be applied are ideally approximately 70° F. but application temperatures may range from 60° F. to 100° F. although at the higher temperatures, control of the cure time is more difficult to maintain. Moreover, by providing the controlled mixing and discharge of the composition of the present invention from a mixing unit to a receiving and temporary storage hopper, complete mixing of the materials making up the composition of the present invention may be assured. Furthermore, by application of the granular particles to finite batches of the liquid elastomer mixture, the control of the type of particles and concentration of the particles by weight is more easily obtained in the multilayer application processes, as described in conjunction with FIGS. 2 and 3 of the drawings.

Those skilled in the art will appreciate from the foregoing that various substitutions and modifications in the composition of the runway surface of the present invention, as well as the method of applying same to a substrate, may be carried out without departing from the scope and spirit of the present invention, as defined in the appended claims.

What we claim is:

1. A runway comprising at least one layer formed by a mixture of a urethane elastomer base material having resilient granular particles dispersed substantially throughout said base material and totally encapsulated by said base material, said particles having a maximum thickness of from approximately 0.0625 inches to 0.125 inches and comprising approximately 26% to 30% of the total composition of said mixture by weight so as to provide a roughened traction surface of said runway comprising the top surface of said at least one layer.

2. The runway set forth in claim 1 wherein: said particles are formed of an elastomeric material.

3. The runway set forth in claim 2 wherein: said particles comprise a urethane elastomer.

4. The runway set forth in claim 2 wherein: said particles comprise a rubber.

5. The runway set forth in claim 2 wherein:

said particles are of an irregular shape and have a nominal maximum linear dimension of approximately 0.125 inches.

6. The runway set forth in claim 1 wherein:

the average thickness of said runway is approximately 0.38 to 0.50 inches.

7. The runway set forth in claim 1 wherein:

said runway includes a surface coating of urethane elastomer applied over said top surface without substantially altering the surface texture of said top surface.

8. A runway comprising plural layers of an elastomer base material, at least the top layer of said plural layers being formed by a mixture of said elastomer base material and resilient granular particles dispersed substantially uniformly throughout and totally encapsulated by said base material, said particles having a thickness in the range of from approximately 0.0625 inches to 0.125 inches and said runway having an average minimum thickness of at least about 0.38 inches to provide a cushioned runway having a roughened traction surface.

9. The runway set forth in claim 8 wherein:
said runway comprises at least two layers of said mixture applied one on top of the other after the first of said layers has solidified.

10. The runway set forth in claim 9 wherein:
said runway comprises first and second layers of encapsulated rubber particles and a third layer of encapsulated urethane elastomer particles, said third layer comprising the top layer.

11. The runway set forth in claim 9 wherein:
the composition of said layers is such that at least in said first layer said particles comprise approximately 29.5% of the total composition of said mixture by weight.

12. The runway set forth in claim 9 wherein:
said particles comprise approximately 32% of the total composition by weight of said top layer.

13. A runway comprising plural layers formed by a mixture of a urethane elastomer base material and resilient granular particles dispersed substantially uniformly throughout said base material in each of said layers and being totally encapsulated by said base material in each of said layers, said particles in each of said layers having a maximum thickness in the range of from approximately 0.0625 inches to 0.125 inches, and the average thickness of said runway is in the range of approximately 0.38 inches to 0.50 inches to provide a cushioned runway having a roughened traction surface comprising the top surface of said plural layers.

14. A runway comprising at least one layer formed by a mixture of a urethane elastomer base material having resilient granular particles dispersed substantially throughout said base material and totally encapsulated by said base material, said particles having a thickness of from approximately 0.0625 inches to 0.125 inches and comprising at least approximately 26% of the total composition of said mixture by weight so as to provide a roughened traction surface of said runway comprising the top surface of said at least one layer.

15. A runway comprising at least one layer formed by a mixture of a urethane elastomer base material having resilient granular particles dispersed substantially throughout said base material and totally encapsulated by said base material, said particles having a maximum thickness of from approximately 0.0625 inches to 0.125 inches and comprising approximately less than 32% of the total composition of said mixture by weight so as to provide a roughened traction surface of said runway comprising the top surface of said at least one layer.

16. A runway comprising at least one layer of a mixture of a two part urethane elastomer base material and resilient granular particles dispersed substantially uniformly throughout said base material in said at least one layer and being encapsulated by said base material in said at least one layer, said particles having a maximum thickness in the range of from approximately 0.0625 inches to 0.125 inches, and the nominal thickness of said at least one layer is no more than approximately the maximum thickness of said particles so as to provide a roughened traction surface comprising the top surface of said at least one layer, said runway being formed by mixing a quantity of a first part and a second part comprising said two parts of said urethane elastomer base material, then mixing said particles into said mixed quantity for applying said mixture to a substrate.

17. A runway for use as a running surface comprising at least one layer of a urethane elastomer base material having a quantity of resilient granular particles dispersed throughout said base material and encapsulated by said base material, at least some of said particles being in a size range of at least 0.0625 inches thickness so as to provide a uniformly roughened traction surface wherein said base material is prepared by mixing in a container batches of first and second parts of a two part urethane elastomer followed by mixing in a predetermined quantity of said particles in each of said batches and applying said batches to a substrate, and wherein the viscosity of successive ones of said batches is controlled to provide uniformly dispersed particles throughout said base material by adding one part of said base material to said container first during the preparation of successive batches to control the viscosity of residue from a previous batch.

18. The runway set forth in claim 17 wherein:
said runway comprises plural layers of said base material having granular particles dispersed throughout said base material, the thickness of each of said layers not being substantially greater than the maximum thickness of said particles.

19. A runway for use as a running surface comprising at least one layer of a urethane elastomer base material having a quantity of resilient granular particles dispersed throughout said base material and encapsulated by said base material, at least some of said particles being in a size range of at least 0.0625 inches thickness so as to provide a uniformly roughened traction surface wherein said base material is prepared by mixing in a container batches of first and second parts of a two part urethane elastomer followed by mixing in a predetermined quantity of said particles in each of said batches and applying said batches to a substrate, and wherein the concentration of particles by weight is controlled by preparing discrete batches of base material and granular particles dispersed throughout said base material in each batch, then mixing into said base material said granular particles, and then discharging said batch from said container and wherein in succeeding batches one part of said base material is added first to said container to control the viscosity of residue from a previous batch whereby the application of said batches to said substrate provides a uniformly dispersed quantity of said granular particles.

20. The runway set forth in claim 19 wherein:
said granular particles have a maximum thickness of about 0.125 inches and the concentration by weight of granular particles in each batch is at least about 26%.

* * * * *